H. L. STOCKS.
ELECTRIC SIGNALING APPARATUS FOR SHIPS' TELEGRAPHS AND LIKE PURPOSES.
APPLICATION FILED OCT. 13, 1913.
1,131,168. Patented Mar. 9, 1915.
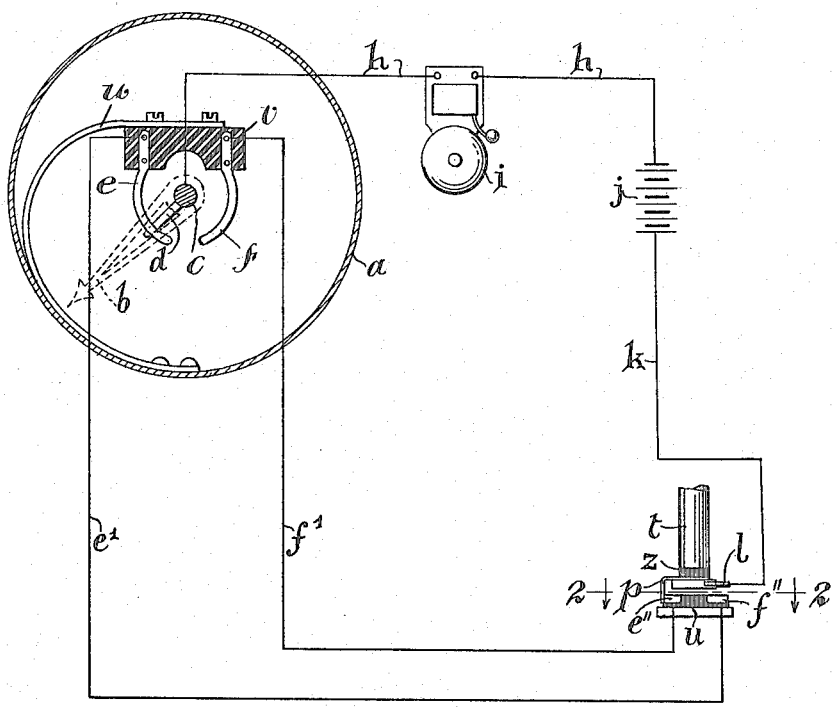
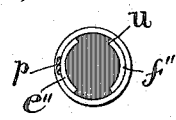

UNITED STATES PATENT OFFICE.

HARRIS LAWRENCE STOCKS, OF KIRKCALDY, SCOTLAND.

ELECTRIC SIGNALING APPARATUS FOR SHIPS' TELEGRAPHS AND LIKE PURPOSES.

1,131,168.   Specification of Letters Patent.   Patented Mar. 9, 1915.

Application filed October 13, 1913.   Serial No. 794,974.

*To all whom it may concern:*

Be it known that I, HARRIS LAWRENCE STOCKS, a citizen of the United Kingdom of Great Britain and Ireland, and resident of 475 High street, Kirkcaldy, Fife, Scotland, have invented certain new and useful Improvements in Electric Signaling Apparatus for Ships' Telegraphs and like Purposes, of which the following is a specification such as will enable others skilled in the art to which it appertains to make and use the same.

This invention relates to electric signaling apparatus for signaling disagreement between an engine controlling mechanism and the order indicator such as, for example, between a ship's telegraph and the reversing gear of a marine engine.

The invention relates more particularly to apparatus of the kind comprising an electric bell circuit controlled by contacts on the indicator or telegraph dial engaged by a rotary contact on the axle of the pointer thereof, and other contacts adjacent to the way shaft.

According to the present invention two stationary contacts, preferably in the form of plate springs or alternatively of segmental form, are mounted adjacent to the engine way-shaft and in electrical connection with contacts on the telegraph and a third contact movable with the way shaft is adapted on the oscillations of the way-shaft to engage alternately with the two stationary contacts first mentioned and through the contact at the telegraph to complete a bell circuit connected therewith whenever there is disagreement between the movements of the way-shaft and the telegraph pointer.

In the accompanying drawings Figure 1 diagrammatically illustrates the arrangement according to the invention. Fig. 2 is a section on the line 2—2 of Fig. 1.

In carrying out the invention the indicator $a$ of a ship's telegraph, having a pointer $b$ mounted on a spindle $c$ is provided with a contact $d$ rotatable with said spindle. In the "stop" position of the pointer $b$ the contact $d$ is inoperative, but when the pointer moves to "ahead" and "astern" it respectively engages with plate spring brushes or wipers $e$ and $f$. The contact $d$ is in electrical connection with the lead $h$ of a bell $i$, the lead $h$ beyond the bell being connected to a battery $j$, the other lead $k$ of which is connected with a plate spring brush or wiper $l$. The brushes $e$ and $f$ are connected respectively by leads $e'$, $f'$, to plate spring brushes or wipers $e''$, $f''$, whereby the lead $e'$ connects up to contact $f'''$ and the lead $f'$ to contact $e''$, the three brushes $l$, $e''$, $f''$, being conveniently mounted on an insulating block $u$ secured to the engine column. The stationary contacts $e''$, $f''$ adjacent to the way-shaft are of segmental form and a contact $p$ in the form of a finger or wiper is adapted, as the way-shaft is turned, to wipe over the contacts $e''$ and $f''$ alternately. The contacts $e$, $f$, at the telegraph indicator are resiliently carried by an insulator block $v$ on a spring $w$ and are adapted to be engaged by a contact $d$ on the spindle of the pointer while an insulating disk or washer $z$ is interposed between the wiper $p$ and the way-shaft. If now an order be transmitted to the engine room to put the engines "ahead" or "astern" the indicator pointer $b$ will move to one side or the other and the contact $d$ will engage with the brush $e$ or $f$ respectively. It will be observed that in the drawing the brush $e$ is connected up to the contact $f''$ on the way shaft, and that the brush $f$ is connected to contact $e''$ on the way shaft. Assuming now that the position at $e$ of the pointer $b$ on the telegraph conveys the order "astern" to the engine room where the contact $e''$ is opposite the "astern" position of the wiper $p$ on the way shaft, it will be evident from the drawing that when the way shaft is in that position there will be no electric communication and consequently the alarm will not be sounded. Should, however, the way shaft be rotated in the wrong direction, *i. e.* so that the wiper $p$ comes in touch with contact $f''$, a circuit is closed and the alarm is caused to sound thus notifying the engineer of the mistake. The alarm will continue to sound until the way shaft is rotated in the correct direction.

The form and arrangement of contacts and brushes is simple but effective and such that the invention can be readily applied to existing installations without requiring any constructional alteration of the same.

What I claim and desire to secure by Letters Patent is:—

In electrical apparatus for signaling disagreement between engine controlling means and order apparatus, the combination with a ship's telegraph provided with a casing;

of a pointer in the telegraph, a shaft supporting said pointer, a rotary contact brush on the shaft and normal thereto, a loose spring fixed to the inner wall of said casing, an insulating block at the free end of said loose spring, and contacts fixed to the insulating block and adapted for engagement by the rotary contact brush.

In witness whereof I have hereunto set my hand in presence of witnesses.

HARRIS LAWRENCE STOCKS.

Witnesses:
W. L. MACINDOE,
WILLIAM LOWSON MACINDOE,
HUGH BLAIR BARR.

Copies of this patent may be obtained for five cents each, by addressing the " Commissioner of Patents. Washington, D. C."